United States Patent
Canion et al.

(10) Patent No.: US 8,756,337 B1
(45) Date of Patent: Jun. 17, 2014

(54) NETWORK PACKET INSPECTION FLOW MANAGEMENT

(75) Inventors: Rodney S. Canion, West Lake Hills, TX (US); Alexander I. Tomlinson, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1656 days.

(21) Appl. No.: 12/183,143

(22) Filed: Jul. 31, 2008

Related U.S. Application Data (60) Provisional application No. 60/953,767, filed on Aug. 3, 2007.

(51) Int. Cl.
*G06F 15/173* (2006.01)

(52) U.S. Cl.
USPC ........... 709/238; 709/223; 709/240; 370/242; 370/244; 370/237; 370/395.31; 713/153; 713/201; 726/13

(58) Field of Classification Search
USPC ............. 709/238, 240; 370/244, 395.31, 282, 370/351; 726/22; 713/188
See application file for complete search history.

(56) References Cited

U.S. PATENT DOCUMENTS

| | | | |
|---|---|---|---|
| 7,233,986 B1 * | 6/2007 | Jair et al. | 709/223 |
| 7,409,460 B1 * | 8/2008 | Li | 709/240 |
| 7,630,379 B2 * | 12/2009 | Morishita et al. | 370/395.31 |
| 2005/0021939 A1 * | 1/2005 | Le et al. | 713/153 |
| 2006/0114832 A1 * | 6/2006 | Hamilton et al. | 370/244 |
| 2007/0006293 A1 * | 1/2007 | Balakrishnan et al. | 726/13 |
| 2009/0303882 A1 * | 12/2009 | Tanaka et al. | 370/237 |

* cited by examiner

*Primary Examiner* — Kyung H Shin (57) ABSTRACT

Deep packet inspection is performed on packets in a network intrusion prevention system. A processing priority may be assigned to a packet based on characteristics such as the protocol type of the packet. Higher-priority packets may be processed before lower-priority packets or otherwise given preferential processing treatment. Deep packet inspection may be performed on the packet, and the processing priority of the packet may be changed based on the amount of time required to complete inspection of the packet. For example, the processing priority of the packet may be lowered if inspection of the packet takes longer than a predetermined time threshold. Furthermore, inspection of such packets may be suspended and either terminated or resumed at a subsequent time.

16 Claims, 7 Drawing Sheets

NETWORK PACKET INSPECTION FLOW MANAGEMENT

RELATED APPLICATION

This application claims the benefit of U.S. Provisional Application No. 60/953,767 entitled "Network Packet Inspection Flow Management" filed Aug. 3, 2007, by Canion, et al.

BACKGROUND

As the use of digital electronic communication networks has grown in recent years, the sophistication of internal and external network attacks in the form of viruses, Trojan horses, worms, and malware of various kinds has increased dramatically. Just as dramatic is the accelerated increase of network speeds and a corresponding drop in network costs, thereby driving the rapid adoption of networks. These and other factors have necessitated the development of innovative and more advanced network security measures.

For example, Intrusion Detection Systems (IDS) can often detect network attacks, but as passive systems they generally offer little more than after-the-fact notification. In contrast, Intrusion Prevention Systems (IPS) have been developed to complement traditional security products, such as firewalls, by proactively analyzing network traffic flows and active connections while scanning incoming and outgoing requests. As network traffic passes through the IPS, it is examined for malicious packets. Such examination may be performed by one or more "deep packet inspection engines" which perform "deep packet inspection" on some or all of the packets in the network traffic. Traffic is blocked if the IPS identifies it as posing a potential threat or as being associated with an unwanted application, while legitimate traffic is allowed to pass through the system unimpeded.

Properly implemented, an IPS can be an effective network security safeguard. There are, however, needs for improved IPS capabilities. For example, an IPS may include multiple deep packet inspection engines for performing deep packet inspection on traffic flows passing through the IPS because a single deep packet inspection engine, typically implemented as a microprocessor executing a suitable operating system and software, may not be capable of processing the flows at a sufficiently high throughput. Techniques for balancing network traffic load among multiple deep packet inspection engines in an IPS to increase the aggregate performance of such engines and thereby the overall performance of the IPS are disclosed in U.S. patent application Ser. No. 11/443,490, filed by Brian C. Smith, Alexander Sarin, and Hazem M. Kadaba on May 30, 2006, entitled "Intrusion Prevention System Edge Controller"; and U.S. patent application Ser. No. 11/782,840, filed by Gerald S. Stellenberg, Brian C. Smith, and James M. Rollette on Jul. 25, 2007, entitled "System and Method for Traffic Load Balancing to Manage Multiple Processors".

Furthermore, the amount of time required to perform deep packet inspection on a single packet may vary widely from packet to packet. This amount of processing time, referred to as "inspection latency," is affected, for example, by packet length and by the type of the packet. If the type of packet inspection applied to a particular type of packet requires that a complex regular expression ("regex") pattern be matched against the packet, the inspection latency for that packet may be many orders of magnitude greater than the packet transmission speed. For example, the transmission time of a maximum-size Ethernet packet over a gigabit Ethernet link is 12.304 microseconds. Applying deep packet inspection to a packet using a recursive regex pattern may take 10 milliseconds or longer, i.e., approximately 1,000 times longer than the transmission speed.

Typically, however, up to 90-99% of network traffic does not require deep packet inspection. For such traffic, the inspection latency is much closer to the transmission latency than for packets requiring deep packet inspection. If, however, a particular network traffic flow queued for processing by a particular deep packet inspection engine includes a packet requiring deep packet inspection, the transmission of subsequent packets in the same flow will be delayed as such packets wait for the packet requiring deep packet inspection to be inspected.

Although employing multiple deep packet inspection engines within an IPS and applying load balancing techniques to spread packet flows among those engines, as described in the above-referenced patent applications, may provide some performance improvement, each deep packet inspection engine may still be responsible for processing thousands of active flows at a time. As a result, within a single deep packet inspection engine, the transmission of packets/flows not requiring deep packet inspection may still be delayed by the time required to inspect those packets/flows in the same engine which require deep packet inspection.

What is needed, therefore, are techniques for improving the performance of Intrusion Prevention Systems when processing flows having varying inspection requirements.

SUMMARY

Deep packet inspection is performed on packets in a network intrusion prevention system. A processing priority may be assigned to a packet based on characteristics such as the protocol type of the packet or the characteristics of the packet flow. Higher-priority packets may be processed before lower-priority packets or otherwise given preferential processing treatment. Deep packet inspection may be performed on the packet, and the processing priority of the packet may be changed based on the amount of time required to complete inspection of the packet. For example, the processing priority of the packet or packet flow may be lowered if inspection of the packet takes longer than a predetermined time threshold. Furthermore, inspection of such packets may be suspended and either terminated or resumed at a subsequent time.

For example, one embodiment of the present invention is directed to a computer-implemented method comprising: (A) applying deep packet inspection to a first packet; and (B) if deep packet inspection of the first packet is not completed within a predetermined maximum amount of time, then suspending deep packet inspection of the first packet. The method may further include forwarding the first packet toward its destination if deep packet inspection of the first packet is completed within a predetermined maximum amount of time.

Another embodiment of the present invention is directed to a computer-implemented method comprising: (A) applying deep packet inspection to a first packet according to a first processing priority indicated by a first state of the first packet; (B) if deep packet inspection of the first packet is not completed within a first predetermined maximum amount of time, then changing the first state of the first packet to indicate a second processing priority that is lower than the first processing priority.

Yet another embodiment of the present invention is directed to a method comprising: (A) identifying a packet in an electronic communications network; (B) identifying a flow of which the packet is a member; (C) identifying a first deep packet inspection priority of the flow; (D) applying deep packet inspection to a first packet according to the first deep packet inspection priority of the flow; and (E) if deep packet inspection of the first packet is not completed within a predetermined maximum amount of time, then assigning a second deep packet inspection priority to the flow that is lower than the first deep packet inspection priority.

Other features and advantages of various aspects and embodiments of the present invention will become apparent from the following description and from the claims.

DETAILED DESCRIPTION

Figure 1:
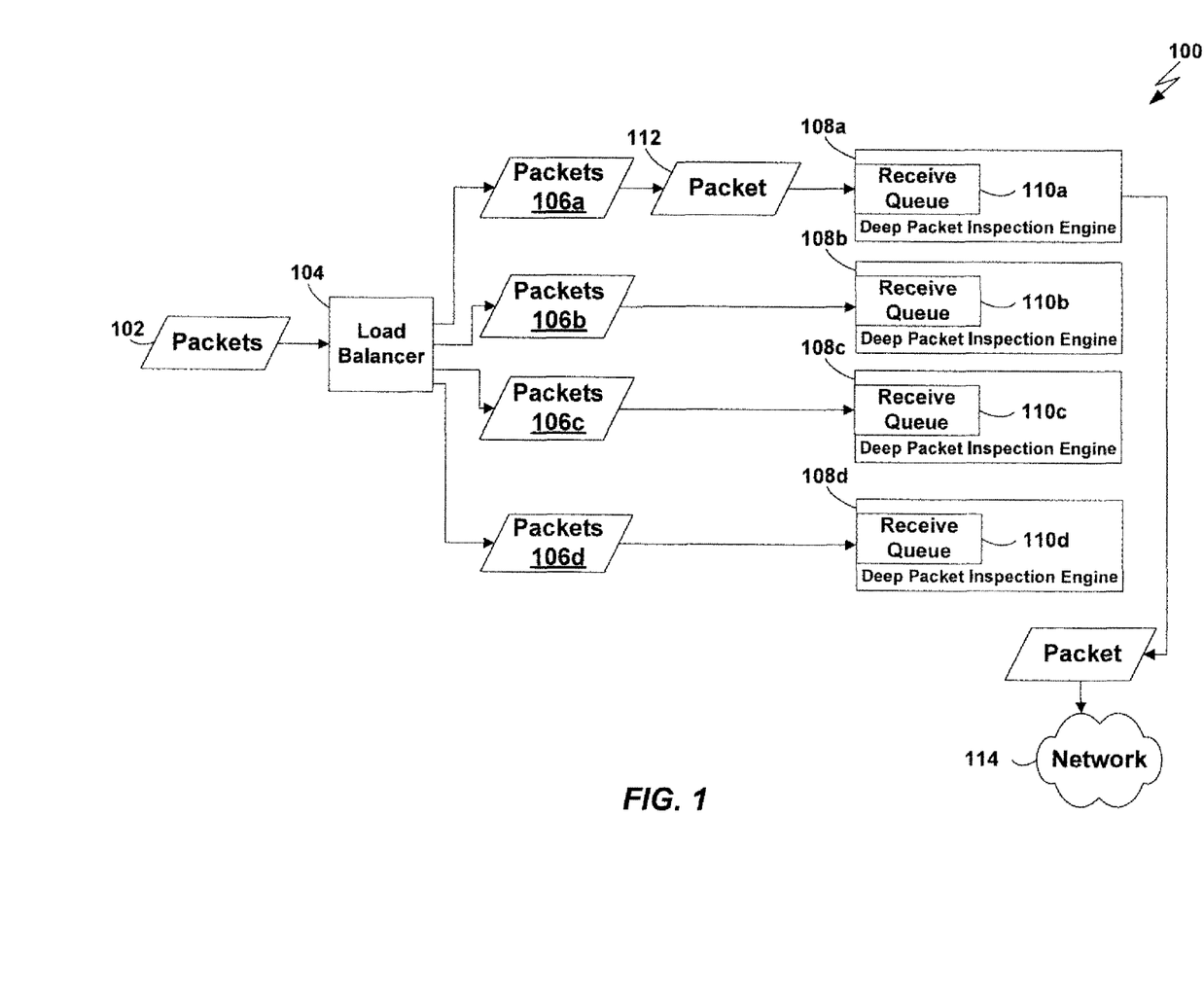
FIG. 1 is a block diagram of a network Intrusion Prevent System (IPS) according to one embodiment of the present invention.
Figure 2A:
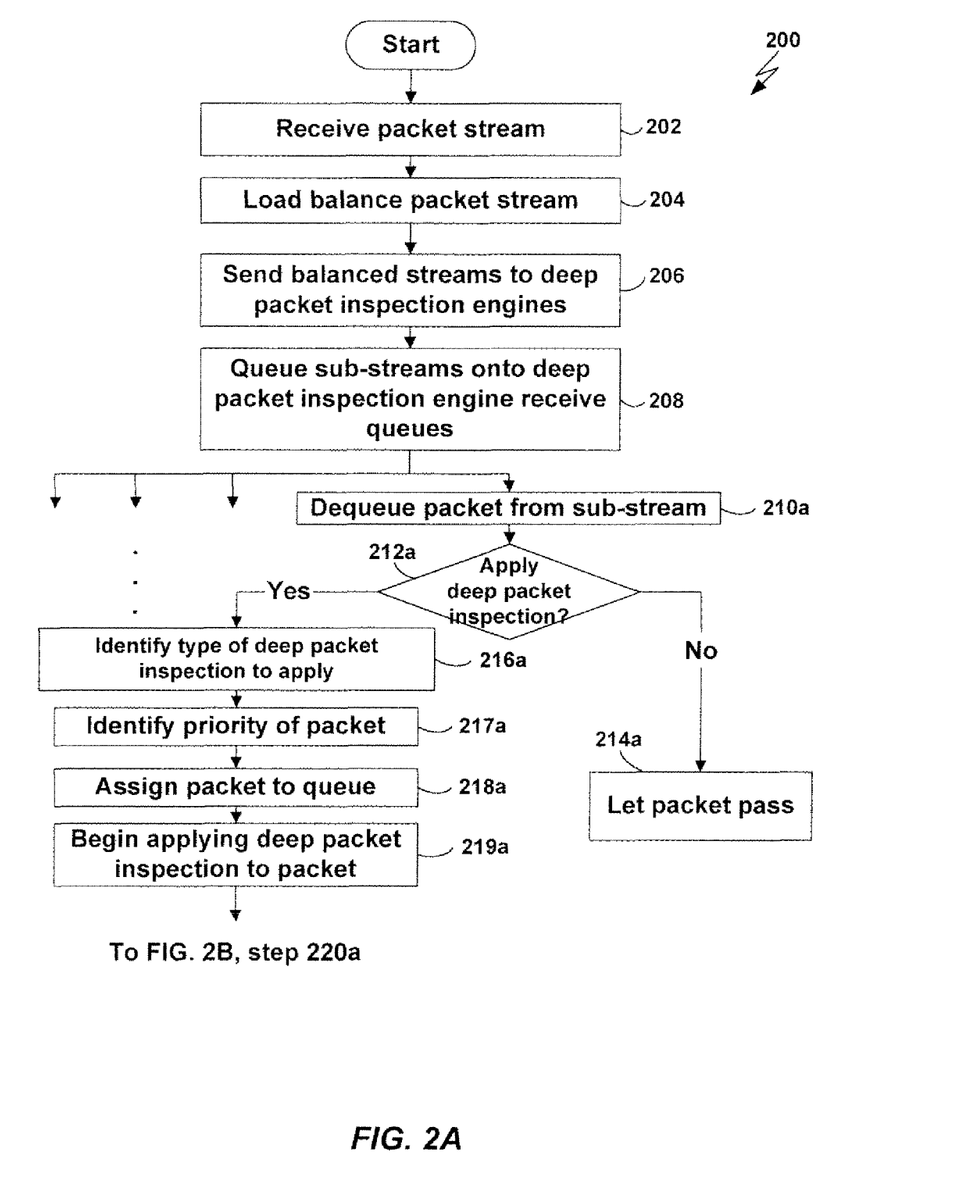
FIGS. 2A-2B are flowcharts of a method performed by the system of FIG. 1 according to one embodiment of the present invention.
Figure 2B:
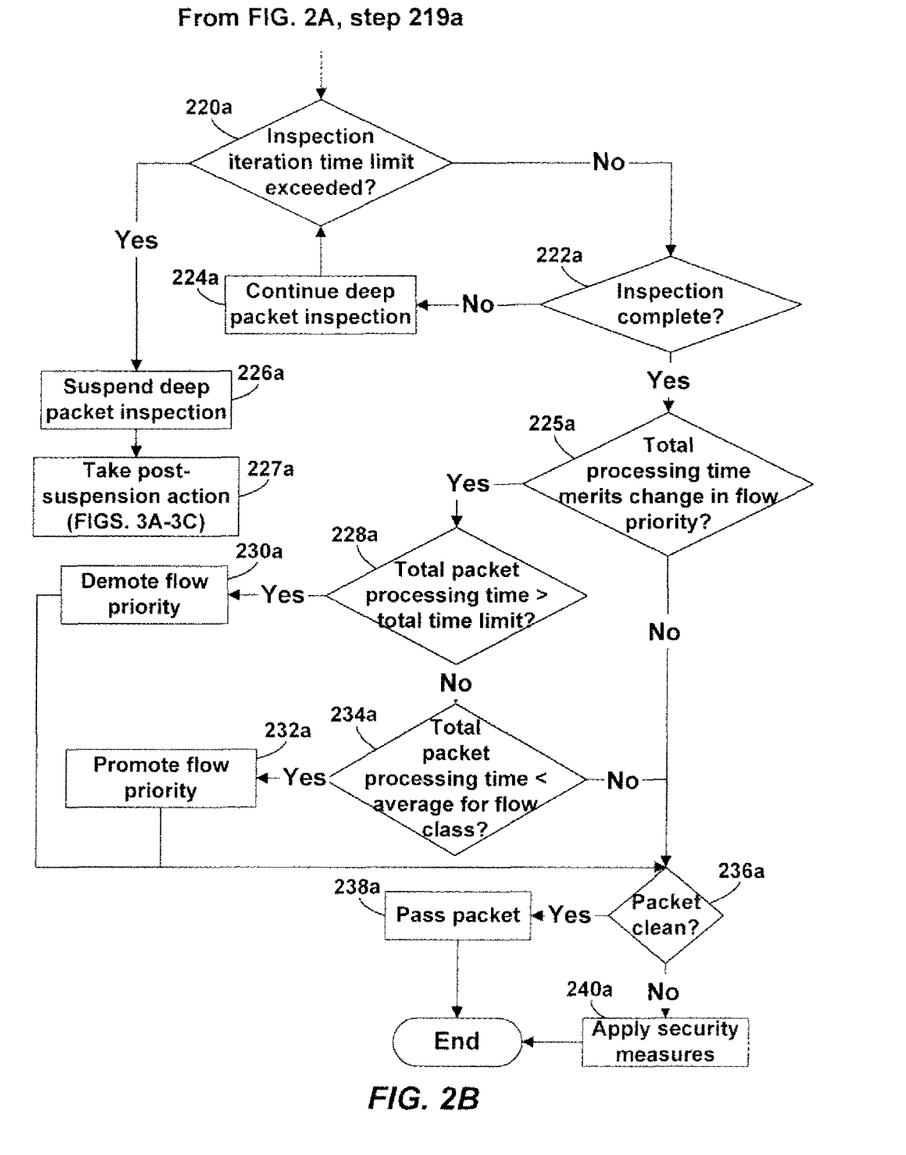

Referring to FIG. 1, a block diagram is shown of a network Intrusion Prevention System (IPS) 100 according to one embodiment of the present invention. Referring to FIGS. 2A-2B, a flowchart is shown of a method 200 performed by the system 100 of FIG. 1 according to one embodiment of the present invention.

A stream of packets 102 enters a load balancer 104 (step 202), which divides the stream of packets 102 into four sub-streams 106a-d (step 204), which the load balancer 104 sends to deep packet inspection engines 108a-d, respectively (step 206). Examples of techniques that may be used to implement the load balancer 104 may be found in U.S. patent application Ser. Nos. 11/443,490 and 11/782,840. Although four sub-streams 106a-d are shown in FIG. 1 for purposes of example, the load balancer 104 may balance the incoming packet stream 102 onto any number of sub-streams.

Deep packet inspection engines 108a-d include receive queues 110a-d, respectively. The deep packet inspection engines 108a-d receive the packet sub-streams 106a-d and queue the packets in the sub-streams 106a-d onto the receive queues 110a-d, respectively (step 208). The receive queues 110a-d are examples of "packet inspection queues," as that term is used herein. A packet inspection queue is a queue onto which packets are queued for a determination of whether they require deep packet inspection, and for deep packet inspection if required. The receive queues 110a-d may, for example, be first-in first-out (FIFO) queues, according to which the packets in the sub-streams 106a-d are processed by the corresponding deep packet inspection engines 108a-d in the order in which the packets in the sub-streams 106a-d are received by the deep packet inspection engines 108a-d.

The deep packet inspection engines 108a-d process their receive queues 110a-d as follows. For ease of explanation, the following description will refer to one of the deep packet inspection engines 108a. The other deep packet inspection engines 108b-d may, however, perform the same actions in parallel with the deep packet inspection engine 108a.

The deep packet inspection engine 108a dequeues the next packet 112 from the receive queue 110a (step 210a). The deep packet inspection engine 108a determines whether to apply deep packet inspection to the packet (step 212a). The deep packet inspection engine 108a may make this determination in any of a variety of ways. For example, the deep packet inspection engine 108a may examine the header of the packet 112 to identify the protocol type (e.g., HTTP, VoIP) of the packet 112. The deep packet inspection engine 108a may be configured to apply deep packet inspection to packets of some protocol types and not others. For example, HTTP packets may require deep packet inspection, while spanning tree bridge packets may not require deep packet inspection.

If the deep packet inspection engine 108a determines that the packet 112 does not require deep packet inspection, the deep packet inspection engine 108a may allow the packet 112 to pass, and forward the packet 112 towards its destination on the network 114 (step 214a).

If the deep packet inspection engine 108a determines that the packet 112 requires deep packet inspection, the deep packet inspection engine 108a identifies which type of deep packet inspection to apply to the packet 112 (step 216a). For example, the deep packet inspection engine 108a may be configured to apply certain filters to HTTP packets and other kinds of filters to FTP packets.

The deep packet inspection engine 108a identifies a processing priority of the packet 112 (step 217a). For example, referring to FIG. 4, the deep packet inspection engine 108a may include a packet processing priority identifier 420 which identifies a processing priority of the packet 112. The priority identifier 420 may identify the processing priority of the packet 112 in any of a variety of ways. For example, the deep packet inspection engine 108a may store the states 422 of all active sessions (flows) being processed by the deep packet inspection engine 108a. The state of each flow may include the processing priority of the flow. Therefore, the packet processing priority identifier 420 may identify the processing priority of the packet 112 by, for example, determining whether the packet 112 is the first packet in a new flow or part of an existing flow. If the packet 112 is the first packet in a new flow, the priority identifier 420 may assign a default processing priority, such as a high priority, to the packet 112. If the packet 112 is part of an existing flow, the priority identifier 420 may read the priority of the flow from the flow states 422 and assign the flow's priority to the packet 112.

Figure 4:
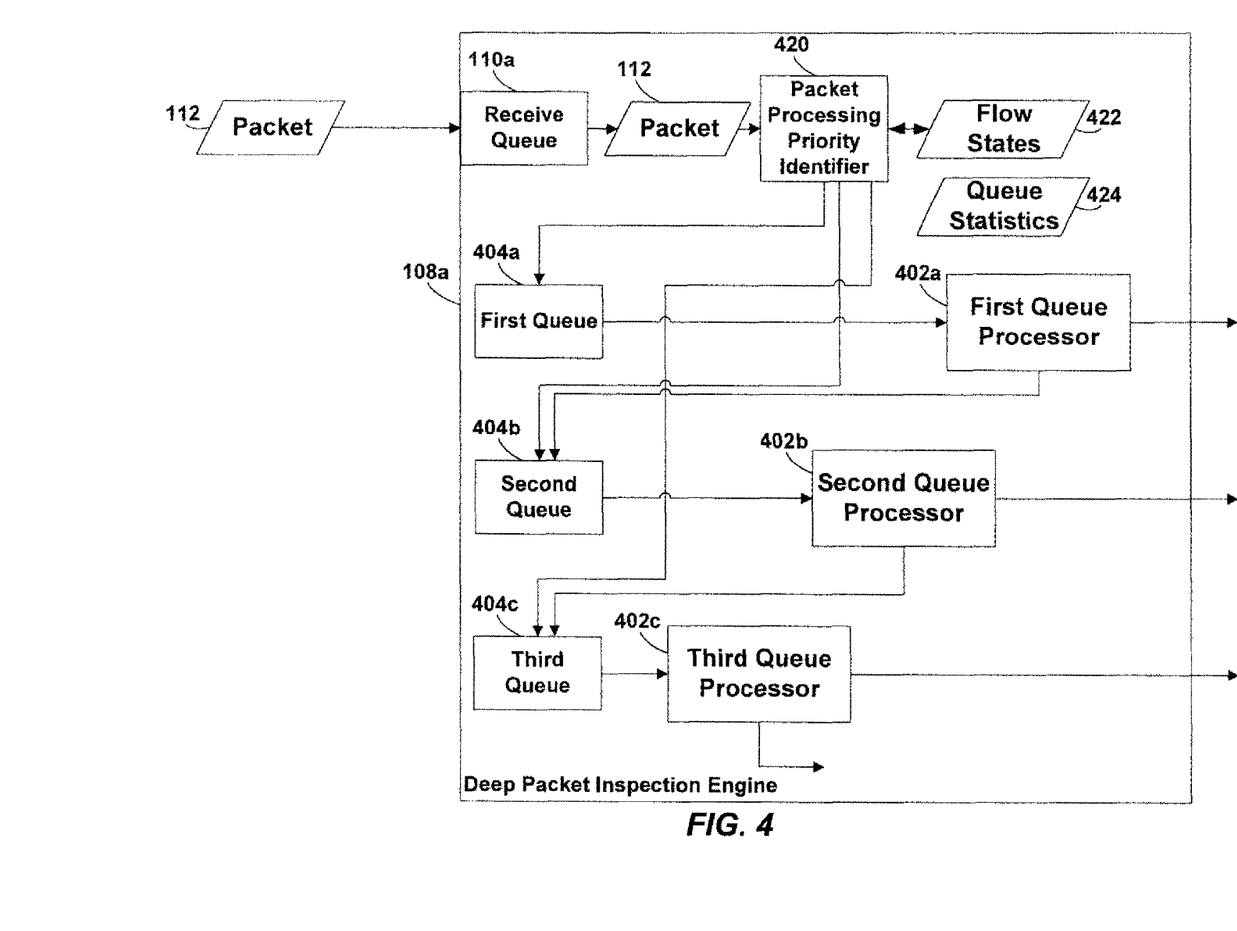
FIG. 4 is a diagram of the deep packet inspection engine of FIG. 1 in more detail according to another embodiment of the present invention.

The deep packet inspection engine 108a assigns the packet 112 to a deep packet inspection queue based on the processing priority of the packet (step 218a). For example, the deep packet inspection engine 108a may include deep packet inspection queues 404a-c, each of which is associated with a different processing priority. For example, queue 404a may be associated with a first (e.g., high) priority, queue 404b may be associated with a second (e.g., medium) priority, and queue 404c may be associated with a third (e.g., low) priority. Therefore, if the packet 112 has the first (e.g., high) priority, the packet 112 may be assigned to the first queue 404a. If the packet 112 has the second (e.g., medium) priority, the packet 112 may be assigned to the second queue 404b. If the packet 112 has the third (e.g., low) priority, the packet 112 may be assigned to the third queue 404c.

For purposes of example, the remainder of FIG. 2A assumes that the packet 112 is the first packet in a new flow and that the packet 112 has been assigned the first processing priority by default. Assume further for purposes of example that the packet 112 is the only packet in the first queue 404a, or that the packet 112 is otherwise the next packet in line to be processed from the first queue 404a. The deep packet inspection engine 108a begins applying the identified type of deep packet inspection to the packet 112 (step 219a).

The deep packet inspection engine 108a may be configured with a predetermined maximum amount of time, such as 100 microseconds, to apply deep packet inspection to any particular packet during a single iteration of deep packet inspection. This time limit is referred to herein as the "inspection iteration time limit." The deep packet inspection engine 108a determines whether the amount of time spent applying deep packet inspection to the packet 112 so far exceeds the predetermined inspection iteration time limit (step 220a). If the inspection iteration time limit has not been exceeded, the deep packet inspection engine 108a determines whether deep packet inspection of the packet 112 is complete (step 222a).

If the inspection iteration time limit has not been exceeded and deep packet inspection of the packet 112 is not yet complete, the deep packet inspection engine 108a continues to apply deep packet inspection to the packet 112 (step 224a) and returns to step 220a.

If deep packet inspection completes before the inspection iteration time limit has been exceeded (step 222a), then the deep packet inspection engine 108a may determine whether the total amount of time spent processing the packet 112 merits a change in the processing priority of the packet's flow (step 225a). As will be described in more detail below with respect to FIGS. 3A and 5, the packet 112 may be processed multiple times, and the deep packet inspection engine 108a may keep track of the aggregate amount of time that has been spent processing each packet so far. Such aggregate processing times may, for example, be stored in the queue statistics 424 (FIG. 4).

The total amount of processing time may merit a change in the processing priority of the packet's flow in a variety of ways. For example, if the deep packet inspection engine 108a determines that the total amount of time spent processing the packet 112 is greater than a predetermined total processing time limit (step 228a), then the deep packet inspection engine 108a may demote (i.e., decrease) the processing priority of the flow (session) to which the packet 112 belongs (step 230a). For example, the processing priority of the flow may be decreased from high to medium or from medium to low, and the resulting processing priority stored in the flow states 422.

If the deep packet inspection engine 108a determines that the total amount of time spent processing the packet 112 is not greater than the predetermined total processing time limit, then the deep packet inspection engine 108a may determined whether the total processing time is less than an average total processing time, or some other expected processing time threshold, for flows of the same class as the packet's flow (step 234a). If so, the deep packet inspection engine 108a may promote (i.e., increase) the processing priority of the flow to which the packet 112 belongs (step 232a).

If inspection of the packet 112 is complete, the deep packet inspection engine 108a may determine whether the results of deep packet inspection indicate that the packet 112 is safe to pass through to the network 114 (step 236a). If the packet is safe (i.e., clean), the deep packet inspection engine 108a forwards the packet 112 towards its destination on the network 114 (step 238a). Otherwise, the deep packet inspection engine 108a (or other component of the IPS 100) takes appropriate security measures in connection with the packet 112 (step 240a).

If the inspection iteration time limit is exceeded before deep packet inspection of the packet 112 is complete (step 220a), then the deep packet inspection engine 108a suspends deep packet inspection of the packet 112 (step 226a). The deep packet inspection engine 108a may perform any of a variety of actions after suspending deep packet inspection of the packet 112 (step 227a).

Figure 3A:
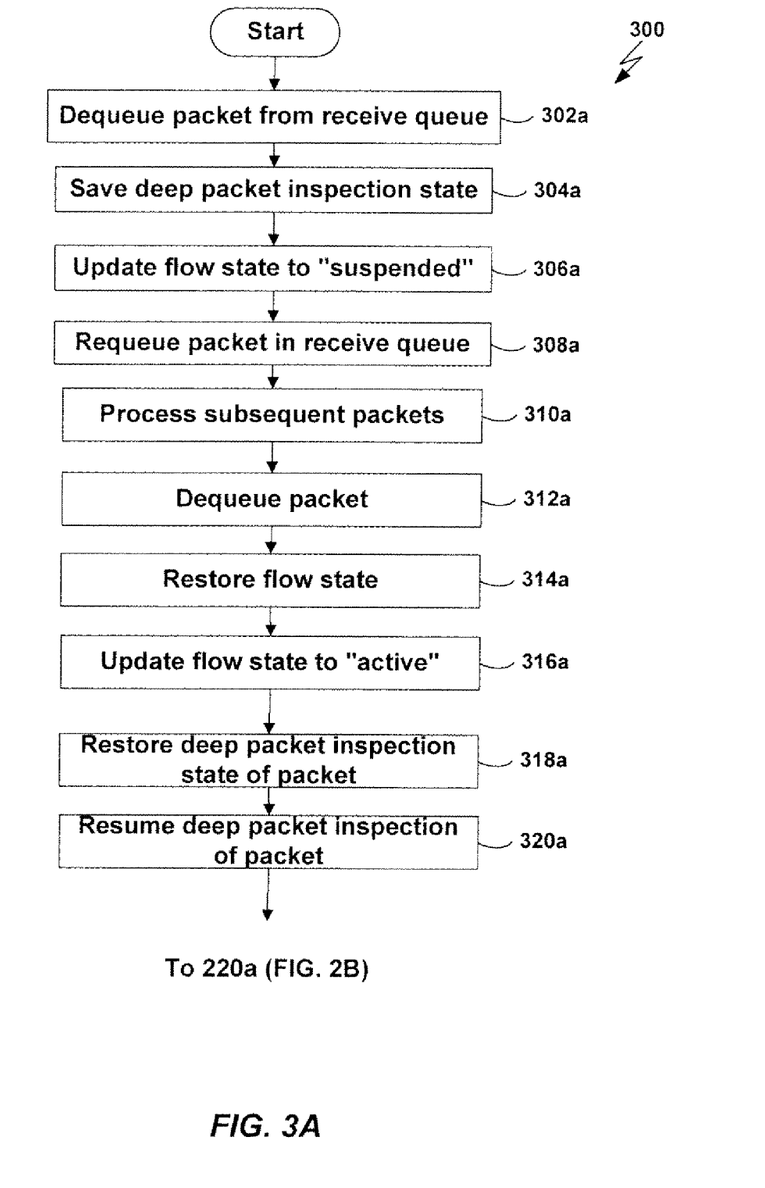
FIGS. 3A-3C are flowcharts of methods for processing a packet after the deep packet inspection processing of such a packet has been suspended.

For example, referring to FIG. 3A, a flowchart is shown of a method 300 that is performed by the deep packet inspection engine 108a after suspending deep packet inspection of the packet 112 according to one embodiment of the present invention. The deep packet inspection engine 108a dequeues the packet 112 from the receive queue 110a (step 302a), saves the state of the deep packet inspection that has been applied to packet 112 so far (step 304a), updates the state of the packet flow (in flow states 422 of FIG. 4) to a state of "suspended" (step 306a), and then requeues the packet 112 onto the receive queue 110a (step 308a). Examples of techniques that may be used to requeue the packet are described, for example, in U.S. patent application Ser. No. 11/745,307, filed by Brian C. Smith and Gerald S. Stellenberg on May 7, 2007, entitled "Method and System for Controlled Delay of Packet Processing with Multiple Loop Paths".

If, as described above, the receive queue 110a is a FIFO buffer, the method 300 shown in FIG. 3A effectively places the packet 112 at the "back of the line" in the receive queue 110a, thereby enabling the deep packet inspection engine 108a to process other packets from the queue 110a without incurring additional delay as a result of attempting to apply deep packet inspection to the packet 112 (step 310a). This may result in a significant performance gain if, for example, many of the packets following the packet 112's initial position in the receive queue 110a either do not require deep packet inspection or require deep packet inspection which may be performed in a shorter amount of time than packet 112. The deep packet inspection engine 108a may process these subsequent packets in the same way described.

At some subsequent time the deep packet inspection engine 108a will again dequeue the packet 112 from the receive queue 110a (step 312a). The deep packet inspection engine 108a may identify that it previously suspended deep packet inspection of packet 112 and, as a result, restore the state of the packet's flow (step 314a), change the state of the flow from "suspended" to "active" (step 316a), and restore the deep packet inspection state of packet 112 that was saved previously in step 304a (step 318a). The deep packet inspection engine 108a may resume deep packet inspection of the packet 112 where it left off in step 226a (step 314a). This may include, for example, assigning the packet 112 to the deep packet inspection queue (e.g., queue 404a, 404b, or 404c) associated with the packet's processing priority. Deep packet inspection of the packet 112 will therefore eventually resume in FIG. 2B at step 220a. If the remainder of deep packet inspection of the packet 112 completes within the predetermined time limit (step 222a), then control passes to step 228a, as described above.

If the remainder of deep packet inspection of the packet 112 again does not complete within the predetermined time limit (step 220a), then deep packet inspection of the packet 112 may again be suspended (step 226a), as described above. Deep packet inspection of the packet 112 may be suspended and resumed, each time saving the deep packet inspection state in between, as many times as necessary to complete deep packet inspection of the packet 112.

Requeueing the packet 112 for subsequent resumption of deep packet inspection is only one example of a technique that may be applied after deep packet inspection of the packet 112 is suspended (step 226a). For example, referring to FIG. 3B, a flowchart is shown of an alternative method 320 that is performed by the deep packet inspection engine 108a after suspending deep packet inspection of the packet 112 according to one embodiment of the present invention.

Figure 3B:
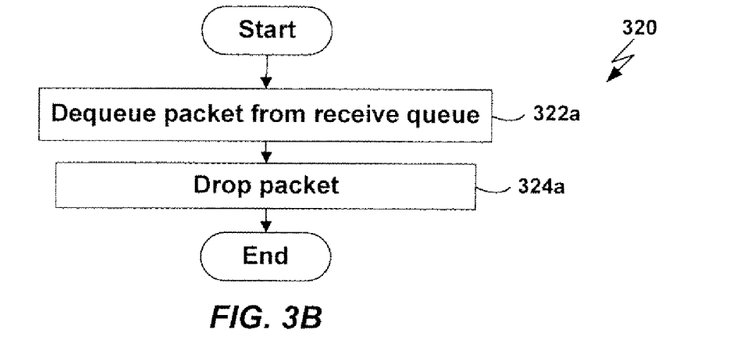

The deep packet inspection engine 108a dequeues the packet 112 from the receive queue 110a (step 322a) and drops the packet 112 (step 324a). In other words, the deep packet inspection engine 108a does not forward the packet 112 towards its destination, requeue the packet 112 for subsequent continuation of inspection, or take any other action with regard to the packet 112. One benefit of this approach is that it ensures that the processing resources of the deep packet inspection engine 108a will not be further consumed by the packet 112, thereby freeing the deep packet inspection engine 108a to process other, less resource-intensive, packets.

Figure 3C:
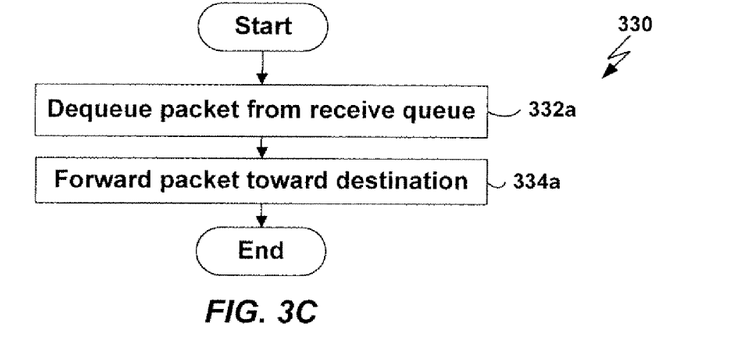

As yet another example, FIG. 3C shows a flowchart of yet another alternative method 330 that is performed by the deep packet inspection engine 108a after suspending deep packet inspection of the packet 112 according to one embodiment of the present invention.

The deep packet inspection engine 108a dequeues the packet 112 from the receive queue 110a (step 332a) and forwards the packet 112 towards its destination on the network 114 (step 334a). One benefit of this approach is that it ensures that the processing resources of the deep packet inspection engine 108a will not be further consumed by the packet 112, thereby freeing the deep packet inspection engine 108a to process other, less resource-intensive, packets.

Figure 5:
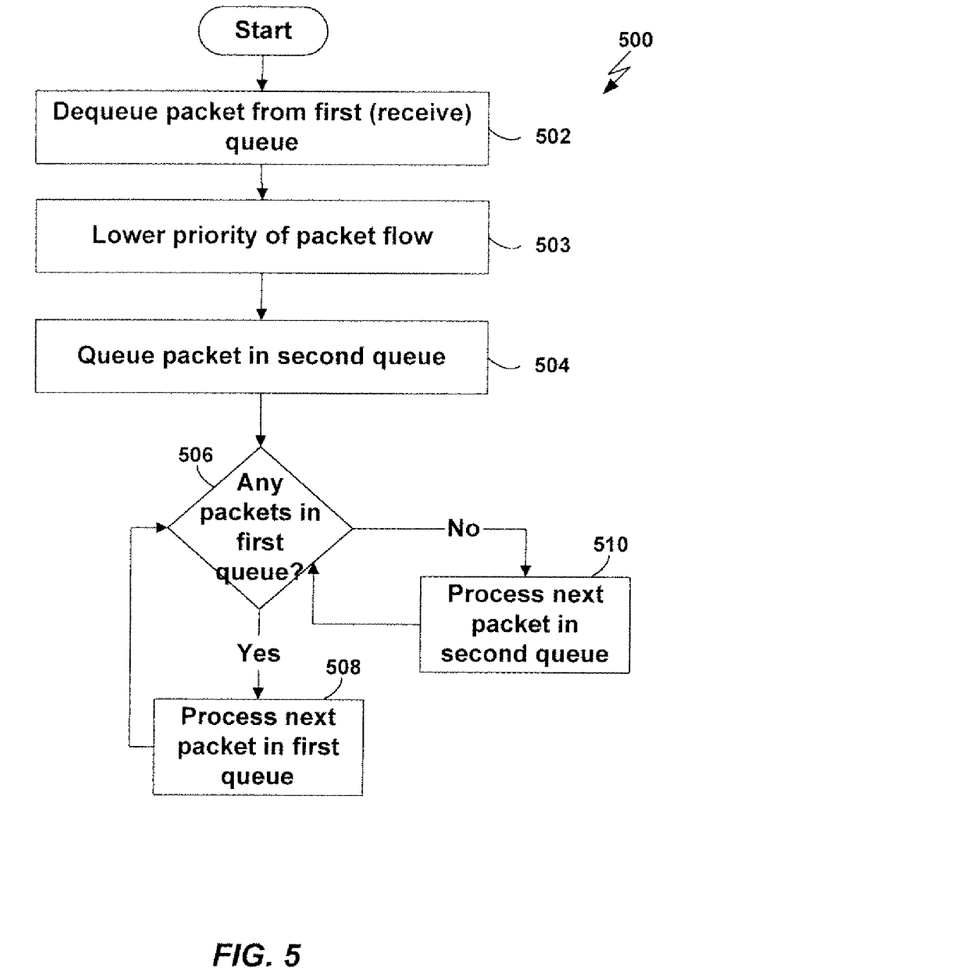
FIG. 5 is a flowchart of a method performed by the deep packet inspection engine of FIG. 4 according to one embodiment of the present invention.

Referring to FIG. 4, a block diagram is shown of the deep packet inspection engine 108a according to an embodiment of the present invention in which packets are processed in queues having different processing priorities depending on the amount of time required to apply deep packet inspection to them. Referring to FIG. 5, a flowchart is shown of a method 500 performed by the deep packet inspection engine 108a according to the embodiment shown in FIG. 4.

The packet stream 106a entering the deep packet inspection engine 108a may include multiple flows, which may be of varying types. Some flows entering the deep packet inspection engine, therefore, may require deep packet inspection while other flows may not. Furthermore, different flows entering the deep packet inspection engine 108a may require different types of deep packet inspection.

In general, the embodiment of the deep packet engine 108a shown in FIG. 4 assigns different flows to different processing queues depending on the amount of time required to perform deep packet inspection on the flows. Flows requiring little processing time are assigned to a first queue (the receive queue 110a in the embodiment shown in FIG. 4) having a first (highest) processing priority. Flows requiring some, but not a significant amount, of processing time are assigned to a second queue 404b having a second (moderate) processing priority. Flows requiring a significant amount of processing time are assigned to a third queue 404c having a third (low) processing priority. Packet flows in the first queue are given deep packet inspection processing priority over packets flows in the second and third queues 404b and 404c. Packet flows in the second queue 404b are given deep packet inspection processing priority over packet flows in the third queue 404c.

For example, the deep packet inspection engine 108a may perform deep packet inspection on packet flows in the third queue 404c only if the first queue 110a and second queue 404b are empty. Similarly, the deep packet inspection engine 108a may perform deep packet inspection on packet flows in the second queue 404b only if the first queue 110a is empty. As a result, if there are any packet flows in the first queue 110a, the deep packet inspection engine 108a applies deep packet inspection to those flows until the first queue 110a is empty, before applying deep packet inspection to flows in the second or third queues 404b or 404c. Similarly, the deep packet inspection engine 108a applies deep packet inspection to any flows in the second queue 404b until the second queue is empty, before applying deep packet inspection to flows in the third queue 404c. As a result, deep packet inspection processing of high-latency flows does not increase the latency of low-latency flows.

Flows may be moved to the second and/or third queues based on observations of the amount of time it has taken to apply deep packet inspection to packets in such flows so far. Alternatively, for example, any flows requiring deep packet inspection may automatically be moved from the first queue 110a to the second queue 404b, without regard to the amount of time actually require to process such flows. Similarly, flows requiring types of deep packet inspection which are known to be particularly time-consuming (such as those involving complex regex patterns) may automatically be moved from the second queue 404b (or directly from the first queue 110a) to the third queue 404c.

The techniques just described may be combined with each other in various ways. For example, any flows requiring deep packet inspection may automatically be moved from the first queue 110a to the second queue 404b. Then, flows which are observed to require a significant amount of time to process may be moved from the second queue 404b to the third queue 404c in response to such observations.

Furthermore, three queues 110a, 404b, and 404c are shown in FIG. 4 merely for purposes of example. The techniques disclosed herein may be applied to any number of queues.

The embodiment illustrated in FIGS. 4 and 5 will now be described in more detail. The method 500 in FIG. 5 may be performed, for example, after deep packet inspection of the packet 112 is suspended for exceeding the predetermined inspection iteration time limit (FIG. 2A, step 226a). Note that in this case the predetermined inspection iteration time limit described above with respect to FIG. 2A may be a first inspection iteration time limit associated with the first (receive) queue 110a. As described below, a second inspection iteration time limit may be associated with the second queue 404b.

Note further that in the embodiment illustrated in FIG. 4, the packet 112 is initially processed from the first queue 110a by a first queue processor 402 in the deep packet inspection engine 108a. The first queue processor 402 processes packets from the first queue 110a. As will be described in more detail below, the deep packet inspection engine 108a also includes a second queue processor 408 for processing packets form the second queue 404b, and a third queue processor 412 for processing packets from the third queue 404c. Although the queue processors 402, 408, and 412 may be implemented as distinct hardware components within the deep packet inspection engine 108a, they may alternatively, for example, be implemented as computer program code within a single computer program.

Once deep packet inspection processing of the packet 112 in the first queue 110a has been suspended, the deep packet inspection engine dequeues the first packet 112 from the first queue 110a (FIG. 5, step 502), changes the processing priority of the packet's flow (in the flow states 422) from "high" to "medium" (step 503), and queues the first packet 112 onto the second queue 404b (step 504). This is an example of "moving" a packet from one queue to another, as that term is used herein.

If there are any packets in the first queue 110a (step 506), the first queue processor 402 processes the next packet in the first queue 110a (step 508). The deep packet inspection engine 108a continues processing packets in the first queue 110a until the first queue 110a is empty. Once there are no more packets in the first queue (step 506), the second queue processor 408 processes the next packet in the second queue 404b (step 510). The deep packet inspection processor 108a then determines whether there are any new packets in the first queue 110a (step 506) and only continues processing packets in the second queue 404b (step 510) if there are no new packets in the first queue 110a.

Similar techniques may be applied to the third queue 404c. For example, step 510 may process packets in the second queue 404b using the techniques described above with respect to steps 210a-232a of FIGS. 2A-2B. If processing of a packet from the second queue 404b takes longer than a second inspection iteration time limit associated with the second queue 404b, then in step 226a processing of the packet may be suspended, and the packet may be moved from the second queue 404b to the third queue 404c in the manner described above with respect to steps 502-504 of FIG. 5. Steps 506-510 may then be adapted to process packets in the second and third queues in a manner analogous to those applied to the first and second queues, respectively. The same process may be applied to add any additional number of queues to the deep packet inspection engine 108a.

In the example just described, each individual packet is assigned to one of the queues 110a, 404b, and 404c based on the amount of time it has taken to process the packet. Alternatively, for example, each flow may be assigned to one of the queues 404a-c. When the deep packet inspection engine 108a receives a packet in a new flow, the deep packet inspection engine 108a may assign the flow to one of the three queues 404a-c. The deep packet inspection engine 108a may, for example, select a queue for assignment based on the protocol type and/or session status of the flow. Alternatively, for example, the deep packet inspection engine 108a may process the first packet in the flow using the techniques disclosed above, identify the final queue into which the packet is queued, and then assign the entire flow to the same queue as the first packet in the flow.

Once the deep packet inspection engine 108a has assigned a queue to a flow, the deep packet inspection engine 108a may store a record of this assignment as part of the flow's state in the flow states 422. When the deep packet receives each packet in the packet sub-stream 106a, the deep packet inspection engine 106a may determine whether the packet is part of an existing flow (i.e., a flow for which the deep packet inspection engine 108a already has saved state). If the packet is part of an existing flow, the deep packet inspection engine 108a may assign the packet to the queue previously assigned to the flow, thereby avoiding the need to assign flows to queues based on observed processing times of individual packets in the flows.

Assigning packets to multiple queues having different priorities, and applying deep packet inspection to those queues based on their priorities, provides the benefit of improving network performance by limiting the ability of slow flows (e.g., flows containing packets requiring lengthy deep packet inspection) to slow down the processing of flows requiring little or no deep packet inspection. Furthermore, the impact on processing time of packets moved to the second and third priority queues 404b-c is minimal because packets in those queues by definition already required significantly longer amounts of time to process, and because packets remaining on the first (highest priority) queue 110a by definition are processed quickly. As a result, in general the time required to empty the first queue 110a, and therefore the amount of time that packets in the second queue 404b must wait to be processed, will be relatively short.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions. In certain examples disclosed herein, the deep packet inspection engines 108a-d assign priorities to packet flows and to individual priorities. Alternatively, for example, the load balancer 104 may perform such functions. For example, the load balancer 104 may identify the types of packets and state the states 422 of packet flows. In such a case, the deep packet inspection engines 108a-d may inform the load balancer 104 of any events which influence flow state, such as suspension of deep packet inspection or demotion of flow priority, so that the load balancer 104 may update the saved state of the flows. If the load balancer 104 identifies and/or stores flow states, the load balancer 104 may use such information to distribute flows having different priorities to different deep packet inspection engines assigned to processing flows having those priorities.

In certain examples disclosed above, a first inspection iteration time limit is applied to deep packet inspection of packets in the first queue 110a, a second inspection iteration time limit is applied to deep packet inspection of packets in the second queue 404b, and a third inspection iteration time limit is applied to deep packet inspection of packets in the third queue 404c. These time limits may be the same as each other or differ from each other. Furthermore, the use of such inspection iteration time limits is merely an example and does not constitute a limitation of the present invention. For example, the second inspection iteration time limit may be applied to processing packets in the second queue 404b only at those times when the first queue 110a is not empty. If, for example, the first queue 110a is empty, then packets in the second queue 404b may be processed without applying an inspection iteration time limit to them. Similarly, the third inspection iteration time limit may be applied to processing packets in the third queue 404c only at those times when the first and second queues 110a and 404b are not empty. If, for example, the first and second queues 110a and 404b are empty, then packets in the third queue 404c may be processed without applying an inspection iteration time limit to them.

Certain embodiments disclosed herein use a "service to exhaustion" policy, according to which all packets of high priority are processed before processing any packets of medium priority, and all packets of medium priority are processed before processing any packets of low priority. Embodiments of the present invention may, however, employ other policies. For example, a "weighted fair service" policy may be used, according to which a large number (e.g., 8) of high-priority packets may be processed, followed by a smaller number (e.g., 4) of medium-priority packets, followed by yet a smaller number (e.g., 2) of low-priority packets. Such a policy may be used to prevent starvation of medium- and low-priority flows while still providing greater weight to processing of flows based on their priorities. Those having ordinary skill will appreciate how to apply these and other policies to the techniques disclosed herein.

Although in the examples disclosed above a single deep packet inspection engine is used to process all three queues 110a, 404b, and 408, this is merely an example and not a limitation of the present invention. For example, consider an IPS having 64 deep packet inspection engines. A subset (e.g., two) of such engines may be assigned to process packets in the third queue 404c, in which case the load balancer 104 may distribute packets having the (low) processing priority associated with the third queue 404c to the (two) engines assigned to process packets in the third queue without applying any time limit to such processing, and without having an impact on processing of the other queues 110a and 404b by other deep packet inspection engines in the same IPS.

Each deep packet inspection engine may maintain statistics 424 on each queue, such as the average, maximum, and minimum amount of time spent processing packets in each queue. These statistics may be used to determine how well each thread is balancing workload and may also help to determine how well it is load balancing between deep packet inspection engines. Such statistics 424 may further include, for example, the amount of time that has been spent performing deep packet inspection on each active packet so far. This information may be used to determine (e.g., in step 220a of FIG. 2A) whether the deep packet inspection time limit has been exceeded for a particular packet.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A computer-implemented method comprising:
(A) dequeueing a first packet from a first packet inspection queue;
(B) applying load balancing to a first network packet flow to produce a plurality of network packet flows, wherein a first one of the plurality of network packet flows includes the first packet;
(C) providing the plurality of network packet flows to a plurality of deep packet inspection engines, comprising providing the first one of the plurality of network packet flows to a first one of the plurality of deep packet inspection engines;
(D) queuing packets, including the first packet, in the first one of the plurality of network packet flows onto a packet inspection queue associated with the first one of the plurality of deep packet inspection engines;
(E) applying deep packet inspection to the first packet; and
(F) if deep packet inspection of the first packet is not completed within a predetermined maximum amount of time, then:
(1) suspending deep packet inspection of the first packet.

2. The method of claim 1, further comprising:
(G) forwarding the first packet toward its destination if deep packet inspection of the first packet is completed within a predetermined maximum amount of time.

3. The method of claim 1, wherein (F) further comprises:
(2) receiving a second packet;
(3) applying deep packet inspection to the second packet; and
(4) after (3), resuming deep packet inspection of the first packet.

4. The method of claim 3, wherein (F) further comprises:
(5) before (3), queuing the first packet on the first packet inspection queue; and
wherein (F)(4) comprises dequeueing the first packet from the first packet inspection queue before resuming deep packet inspection of the first packet.

5. The method of claim 3, wherein (F)(2) comprises saving a state of the deep packet inspection of the first packet, and wherein (F)(4) comprises restoring the state of the deep packet inspection of the first packet before resuming deep packet inspection of the first packet.

6. The method of claim 1, wherein (F) further comprises:
(2) dropping the first packet.

7. The method of claim 1, wherein (F) further comprises:
(2) forwarding the first packet toward its destination.

8. The method of claim 1, further comprising:
(G) before (E), identifying a state of the first packet indicating a first processing priority;
wherein (E) comprises applying deep packet inspection to the first packet according to the first processing priority; and
wherein (F) further comprises:
(2) updating the state of the first packet to indicate a second processing priority that is lower than the first processing priority; and
(3) applying deep packet inspection to the first packet according to the second processing priority.

9. The method of claim 1, wherein the predetermined maximum amount of time comprises about 100 microseconds.

10. A computer-implemented method comprising:
(A) dequeueing a first packet from a first packet inspection queue;

(B) applying load balancing to a first network packet flow to produce a plurality of network packet flows, wherein a first one of the plurality of network packet flows includes the first packet;

(C) providing the plurality of network packet flows to a plurality of deep packet inspection engines, comprising providing the first one of the plurality of network packet flows to a first one of the plurality of deep packet inspection engines;

(D) queuing packets, including the first packet, in the first one of the plurality of network packet flows onto a packet inspection queue associated with the first one of the plurality of deep packet inspection engines;

(E) applying deep packet inspection to the first packet according to a first processing priority indicated by a first state of the first packet;

(F) if deep packet inspection of the first packet is not completed within a first predetermined maximum amount of time, then:
  (1) changing the first state of the first packet to indicate a second processing priority that is lower than the first processing priority.

11. The method of claim 10, wherein (E) comprises applying deep packet inspection to the first packet in a first deep packet inspection queue having the first processing priority, wherein (F)(1) comprises moving the first packet to a second deep packet inspection queue having the second processing priority, and wherein the method further comprises:
  (G) after (F), if there is a second packet in the first deep packet inspection queue, then applying deep packet inspection to the second packet;
  (H) otherwise, applying deep packet inspection to the first packet in the second deep packet inspection queue.

12. The method of claim 10, wherein (F) further comprises:
  (2) before (F)(1), suspending deep packet inspection of the first packet; and
wherein (H) comprises resuming the suspended deep packet inspection of the first packet.

13. The method of claim 10, further comprising:
  (G) applying deep packet inspection to the first packet according to the second processing priority;
  (H) if deep packet inspection of the first packet according to the second processing priority is not completed within a second predetermined maximum amount of time, then:
    (1) changing the first state of the first packet to indicate a third processing priority that is lower than the second processing priority.

14. The method of claim 10, wherein (E) comprises using a first processor associated with the first processing priority to apply deep packet inspection to the first packet; and
  wherein (F)(1) comprises changing the first state of the first packet to indicate a second processing priority associated with a second processor.

15. The method of claim 10, wherein (E) comprises using one of a first plurality of processors associated with the first processing priority to apply deep packet inspection to the first packet; and
  wherein (F)(1) comprises changing the first state of the first packet to indicate a second processing priority associated with a second plurality of processors that is smaller in number than the first plurality of processors.

16. A network intrusion prevention system comprising:
  a memory storing machine readable instructions, the machine readable instructions comprising code to:
    dequeue a first packet from a first packet inspection queue;
    apply load balancing to a first network packet flow to produce a plurality of network packet flows, wherein a first one of the plurality of network packet flows includes the first packet;
    provide the plurality of network packet flows to a plurality of deep packet inspection engines, comprising providing the first one of the plurality of network packet flows to a first one of the plurality of deep packet inspection engines;
    queue packets, including the first packet, in the first one of the plurality of network packet flows onto a packet inspection queue associated with the first one of the plurality of deep packet inspection engines;
    apply a deep packet inspection to the first packet; and
    if the deep packet inspection of the first packet is not completed within a predetermined maximum amount of time, suspend the deep packet inspection of the first packet; and
  a processor to execute the machine readable instructions.

* * * * *